(12) United States Patent  
Fishman et al.

(10) Patent No.: US 12,494,715 B1  
(45) Date of Patent: Dec. 9, 2025

(54) BIDIRECTIONAL ISOLATED UNIVERSAL TOPOLOGY FOR HIGH POWER DC-DC CONVERTERS

(71) Applicant: SCHNEIDER ELECTRIC IT CORPORATION, Foxboro, MA (US)

(72) Inventors: Oleg S. Fishman, Maple Glen, PA (US); Hanan Fishman, Fort Washington, PA (US); Michael D. Muhlbaier, Langhorne, PA (US)

(73) Assignee: SCHNEIDER ELECTRIC IT CORPORATION, Foxboro, MA (US)

(*) Notice: Subject to any disclaimer, the term of this patent is extended or adjusted under 35 U.S.C. 154(b) by 393 days.

(21) Appl. No.: 18/124,034

(22) Filed: Mar. 21, 2023

Related U.S. Application Data

(60) Provisional application No. 63/323,567, filed on Mar. 25, 2022.

(51) Int. Cl.
*H02M 3/335* (2006.01)
*H02J 7/00* (2006.01)
*H02M 1/00* (2007.01)
*H02M 3/158* (2006.01)
*H02M 3/28* (2006.01)

(52) U.S. Cl.
CPC ..... *H02M 3/1582* (2013.01); *H02M 3/33573* (2021.05); *H02M 3/33584* (2013.01)

(58) Field of Classification Search
CPC .......... H02M 3/1582; H02M 3/33573; H02M 3/33584; H02M 1/0077; H02M 3/01; H02M 3/285; H02M 3/33576; H02M 7/487

USPC .................. 307/84, 83, 77, 43, 82
See application file for complete search history.

(56) References Cited

U.S. PATENT DOCUMENTS

| | | | |
|---|---|---|---|
| 8,130,518 B2 | 3/2012 | Fishman | |
| 8,212,408 B2 | 7/2012 | Fishman | |
| 8,213,199 B2 | 7/2012 | Fishman | |
| 9,118,215 B2 | 8/2015 | Fishman et al. | |
| 9,350,166 B2 | 5/2016 | Fishman et al. | |
| 9,627,889 B2 | 4/2017 | Fishman et al. | |
| 10,483,759 B2 | 11/2019 | Fishman et al. | |
| 11,146,079 B2 | 10/2021 | Fishman et al. | |
| 2020/0315065 A1* | 10/2020 | Sinn | H02K 5/203 |
| 2021/0111632 A1* | 4/2021 | Shi | H02M 3/33571 |
| 2022/0402390 A1* | 12/2022 | Smolenaers | H02J 3/322 |
| 2024/0258932 A1* | 8/2024 | Kanouda | H02M 7/2173 |

* cited by examiner

*Primary Examiner* — Elim Ortiz
(74) *Attorney, Agent, or Firm* — Kinney & Lange, P.A.

(57) ABSTRACT

Bidirectional isolated universal topology (BIUT) high power DC-DC converter assemblies and systems balance voltages and control currents between high power DC sources and high power DC loads where at least some of the high power DC sources are alternative energy or renewable energy power supplies and high power DC loads associated with alternative energy or renewable energy. The BIUT high power DC-DC converter assemblies and systems are capable of reversing current flow direction where loads become the sources and sources become the load in DC power systems where the supplies and loads are all connected to a common DC voltage bus.

15 Claims, 15 Drawing Sheets

BIDIRECTIONAL ISOLATED UNIVERSAL TOPOLOGY FOR HIGH POWER DC-DC CONVERTERS

CROSS-REFERENCE TO RELATED APPLICATIONS

This application claims the benefit of U.S. Provisional Application No. 63/323,567, filed Mar. 25, 2022, hereby incorporated by reference in its entirety.

FIELD OF THE INVENTION

The present invention relates to a high power density (up to 75 KW per cubic feet); compact-sized (7.5"W×18"L× 21"H), and environmentally rugged (for example NEMA 4 enclosure) DC-DC converter assembly for high capacity (at least 120 kW) alternative energy systems. The DC-DC converter assembly (referred to herein as the mechanical, electrical, electronic components and the enclosure forming the DC-DC converter) is based on a bidirectional isolated universal topology (referred to herein as a "BIUT" DC-DC converter of the present invention). The terminology "universal topology" refers to a BIUT DC-DC converter of the present invention that applies to various sectors of a rapidly developing segment for alternative power DC applications, including but not limited to solar power plants with integrated energy storage systems, DC microgrids, superfast charging of electric vehicles (EV), storage and retrieval of renewable energy in batteries (including lithium ion batteries, flow batteries and other types of batteries), retrieval of energy from fuel cells, (including hydrogen fuel cells), and supply of power for hydrogen generating electrolyzing plants. The DC-DC converter system is referred to herein as a BIUT converter system of the present invention when a BIUT converter is used in one of these alternative power DC applications. Alternative power sources as used herein refers to renewal energy sources and alternative energy sources that are not considered renewable.

BACKGROUND OF THE INVENTION

The terms "high capacity alternative energy system" or "alternative power plant" as used herein applies to such systems having a rated design power output (as understood in the art) from 120 kW to 100 MW and the components used in such systems. Each BIUT DC-to-DC converter controls at least one output transmission of DC power in a wide range of voltages from 3000 VDC to 30 VDC and at least one input voltage from 30 VDC up to 3000 VDC, and current in the range of 0 to 500 amperes DC.

FIG. 1 illustrates typical current state of the art in AC power distribution. The high voltage from a distribution grid 13 is delivered via several individual transformers 12 to individual loads 1 (for example, subdivision houses).

FIG. 2 illustrates the concept of a DC solar power plant with integrated energy storage system. Power from each group of solar arrays 8 is collected by DC-DC converters 5a, 5b and 5c and transmitted to a common DC voltage bus 2a. The converters 5a, 5b and 5c assist in harvesting maximum power from the solar field. During sunshine hours extra energy is stored in the battery storage system (BSS) comprised of several battery packs. Each battery pack 7a, 7b and 7c is connected via an appropriate DC-DC converter to common DC voltage bus 2a. In the time when solar energy is unavailable the energy is discharged into common DC voltage bus 2a. Individual bidirectional DC-DC converters 6a, 6b and 6c assist in charging dissimilar battery packs 7a, 7b and 7c to maximum capacity.

FIG. 3 illustrates the concept of a DC microgrid. A group of power consuming DC loads 1a are connected to a common DC voltage bus 2 (rated +/−350 VDC). The power can be supplied from various sources: at least one PV plant 8, at least one wind turbine 9, at least one hydrogen fuel cell 10, each connected via an appropriate DC-DC converter, or AC grid 13 connected to the common DC voltage bus via transformer 12 and at least one bidirectional AC-DC converter 11. The voltages from each power source may be different. Therefore, various DC-DC converters 3, 4 and 5 with different transfer coefficient $K=V_{in}/V_{out}$ are used to equalize the voltage on the common DC voltage bus 2.

DC power is also charged into the Battery Storage System 17a (BSS). A bidirectional DC-DC converter 16a is used to resolve the voltage difference between the BSS and common DC voltage bus. When the loads' power demand exceeds the supply of the DC microgrid, the BSS supplies the difference. In the case when the AC distribution grid 13 is temporarily overloaded, the energy in the BSS may be fed into the AC grid through a bidirectional DC-AC converter 11 and transformer 12 to support AC grid.

The DC microgrid has several advantages over the present art AC distribution network: (a) the DC microgrid is more robust and reliable—in case of AC distribution grid interruption the AC microgrid continues to supply its loads from the alternative sources or the BSS; (b) the DC microgrid may be installed anywhere, where the AC grid is very weak (that is limited power due to high impedance for long transmission lines); (c) the DC microgrid is environmentally friendly-most, if not all, of the energy it generates comes from clean, renewable sources; and (d) the DC microgrid can support the AC grid, when needed.

EVs are a rapidly growing industry. One of the major challenges in broad scale adoption of EVs is improved rapid charging. Consumer EVs are equipped with 100 kWh to 200 kWh/400 VDC lithium-ion batteries, while larger commercial scale EV trucks and busses are equipped with 500 kWh to 900 kWh lithium-ion batteries.

Presently EV chargers are split into four categories shown in Table 1 below:

TABLE 1

| Classification | Power | Charging time (20%-80%) | |
| --- | --- | --- | --- |
| | | Car | Truck/Bus |
| Level 1 - Residential | <6.5 kW | 12 Hours | 46 Hours |
| Level 2 - Commercial | 6.5-16 kW | 4.7-12 Hours | 18-46 Hours |
| Level 3 - Fast charging | 60-75 kW | 48-60 Minutes | 4-5 Hours |
| Level 4 - Super-Fast Charging | 150-500 kW | 10-15 Minutes | 30 Minutes |

Level 1 and Level 2 chargers are used by consumer EV owners for inner city charging. Level 3 chargers can be used to recharge a car on a highway but at a slow rate. Level 4 Super-Fast Chargers are suitable for long distance driving and cargo hauling by trucks and other large commercial vehicles.

FIG. 4 illustrates an example of a present state of the art multiport EV charging stations. Each charge port consists of a single dispenser 15a through 15d; a single rectifier 14a through 14d; and single transformer 12a through 12d connected to AC grid 13. The ports are designated for different power level EVs: Port 1 for 150 KW; Port 2 for 250 kW; Port 3 for 500 kW; and Port 4 for 1,000 kW.

The maximum power allocated to the charge station is at least 2000 kVA. The power usage varies from 0 kW when there are no EVs at any port in the station to 1900 kW when the station is operating at full capacity.

The DC microgrid Fast Automobile Charging Technology (FACT) concept receives special importance in Super-Fast Charging. FIG. 5 illustrates an example of FACT used in multiport EV charging station based on the DC microgrid concept. The ports are designated for different power level EV: Port 1 for 150 KW; Port 2 for 250 kW; Port 3 for 500 kW; and Port 4 for 1000 kW. All ports are supplied by common DC voltage bus 2c. Each port is equipped with a properly sized DC-DC converter: DC-DC converter 16 for 150 kW; DC-DC converter 17 for 250 KW; DC-DC converter 18 for 500 kW; and DC-DC converter 19 for 1000 kW. The power to common DC voltage bus 2c is supplied from different sources: at least one PV plant 8, at least one wind turbine 9, at least one hydrogen fuel cell 10, or AC grid 13 connected to common DC voltage bus 2c via transformer 12 and bidirectional AC-DC converter 11. The output voltage from each power source is different. Therefore, individual DC-DC converters 5, 4 and 3, and AC-DC converter 11 are provided to equalize their output voltages on common DC voltage bus 2c.

DC power is also charging the Battery Storage System (BSS). DC-DC converter 6 resolves the voltage difference between the output of the BSS and common DC voltage bus 2c. When total power demand on ports 1 to 4 exceeds the supply of the FACT DC microgrid, the BSS supplies the difference. In an operational scenario when the AC power grid 13 is temporarily overloaded, energy from the BSS can support the grid by feeding power into the AC grid from common DC voltage bus 2c through bidirectional DC-AC converter 11 and transformer 12 to support the AC grid.

The FACT DC microgrid of FIG. 5 has a number of advantages over the current state of the art Super-Fast Charger method of FIG. 4 where AC power is supplied to each charging port, namely: (a) FACT DC microgrid power can be supplied from an alternative energy source; (b) when connected only to the AC grid, the FACT DC microgrid does not require expensive AC grid upgrades; (c) the FACT DC microgrid requires less expensive hardware (for example, does not need switchgear and transformers rated to peak 2000 kVA); (d) FACT DC microgrid uses only one transformer 12 rated to about 200 kVA (10% of peak demand) since the remainder is supplied from the BSS; and (e) the FACT DC microgrid reduces the electrical demand charges by flattening the demand and often shifting it to the night hours.

Analysis shows that for the FACT DC microgrid shown in FIG. 5, the equipment cost is reduced by 35%, installation cost is reduced by 43% and annual operating cost is reduced by 57% when compared with the current state-of-the-art multiport EV Super-Fast Charging stations.

When the DC-DC converter 3 of FIG. 5 is a BIUT DC-DC converter of the present invention the converter raises the 350 VDC output voltage from hydrogen fuel cell 10 to a 700 VDC voltage on common DC voltage bus 2c. The BIUT DC-DC converter also provides the required galvanic isolation between hydrogen fuel cell 10 and common DC voltage bus 2c.

When the DC-DC converter 4 of FIG. 5 is a BIUT DC-DC converter of the present invention the DC-DC converter balances the output voltage from the generator side DC-DC converter of windmill 9 and voltage on common DC voltage bus 2c. The BIUT DC-DC converter also provides the required galvanic isolation between the windmill's generator and the common DC voltage bus 2c.

When the DC-DC converter 5 of FIG. 5 is a BIUT DC-DC converter of the present invention the DC-DC converter balances the output voltage from PV solar array 8 and the voltage on common DC voltage bus 2c. The BIUT DC-DC converter 5 also provides Maximum Power Point Tracking (MPPT) to maximize power harvesting from PV solar array 8.

When the bidirectional DC-DC converter 6 of FIG. 5 is a BIUT bidirectional DC-DC converter of the present invention the DC-DC converter balances the output voltage on BSS 7 with the voltage on common DC voltage bus 2c. The BIUT DC-DC converter 6 controls the rate of charging current and discharging current into and out of BSS 7.

As pointed out above the DC microgrid implementation in FIG. 5 needs multiple high power (1 MW or above) DC-DC converters to provide controlled current flow from power sources in the DC microgrid to the power loads (battery charging ports in this example) and to provide controlled current flow to and from a BSS.

As pointed out above in DC microgrid systems different ground potential references are required for some of the DC power sources, for example in FIG. 5, the photovoltaic array 8, wind turbine power generator 9, hydrogen fuel cell 10, BSS 7, the EV batteries being charged and common DC voltage bus 2c. In these situations the BIUT DC-DC converters incorporate galvanic isolation between the DC power sources and the DC loads.

Another rapidly growing field is the production of hydrogen. Hydrogen contains 2.8 times more energy than gasoline. One gallon of gasoline produces 9 kg of $CO_2$ when it releases energy. Hydrogen does not release any $CO_2$. Hydrogen is the fuel of the future and is well positioned to replace many fossil fuels. Hydrogen is produced in electrolyzing generators using Proton Exchange Membrane (PEM) or Solid Oxide Electrolyzing Cell (SOEC) technology. Production of hydrogen consumes a large amount of electric energy, namely about 50 kWh/kg. To be labeled "green" this energy should come from alternative renewable sources such as solar energy.

FIG. 6 illustrates the concept of a hydrogen producing plant configured as a DC microgrid. The alternative power is generated by a group of solar arrays 8 or a group of windmills 9. The appropriate number of parallel connected BIUT DC-DC converters 4 or 5 of the present invention converts the fluctuating solar or wind source voltage into a constant DC bus voltage. Power from common DC voltage bus 2d is regulated by BIUT DC-DC converter 21 of the present invention to the magnitude required by the hydrogen PEM generator 22.

Because alternative power production from sources like solar is intermittent, while the power consumption by the hydrogen plant is at a constant level, the alternative energy power sources must be oversized. The extra energy is stored in a long duration BSS 23. When the alternative sources do not produce power, the energy is drawn from these batteries. BIUT bidirectional DC-DC converters 19a of the present invention balances the batteries' voltages with the voltage on common DC voltage bus 2d. When the alternative energy power sources produce more power than the hydrogen plant and BSS 23 can consume, the extra power can supply the AC grid 13 via BIUT AC-DC converter 11 and transformer 12. When alternative energy is not sufficient and BSS 23 has exhausted its energy, power can be drawn from AC grid 13 via transformer 12 and AC-DC converter 11.

The above applications of a DC microgrid, namely FACT EV charging stations and hydrogen generating plants incorporate large numbers of various BIUT DC-DC converters of the present invention.

U.S. Pat. No. 11,146,079 (Fishman, et. al) discloses a bidirectional optimizer for battery storage systems with galvanic isolation. This optimizer incorporates a special design of a DC-DC converter, used to balance the voltages between two dissimilar batteries. U.S. Pat. No. 11,146,079 is incorporated herein by reference in its entirety.

U.S. Pat. No. 9,627,889 B2 (Fishman, et. al) discloses a high voltage energy harvesting and conversion renewable energy utility-size electric power system. The harvesting network includes distributed renewable energy power optimizers and transmitters that control delivery of renewable energy. These power optimizers are used as DC/DC converters with galvanic isolation between input and output. U.S. Pat. No. 9,627,889 B2 is incorporated herein by reference in its entirety.

When the alternative power utility-scale solar plant is augmented with a stored energy source the issue becomes even more complicated. One solution is proposed in U.S. Pat. No. 10,483,759 B2 (Fishman) that discloses an integrated multi-mode, large-scale electric power support system supplies on demand at least 250 MW to an electrical grid either from co-located solar, wind or fuel energy cell renewable energy DC power sources, or in combination with, or alternatively, from system stored energy DC power sources via a plurality of DC-to-AC converters 11 with phase-shifted outputs and solar power optimizers; U.S. Pat. No. 10,483,759 B2 is incorporated herein by reference in its entirety.

In a utility-scale solar power plant, a plurality of PV solar cells 8 as shown, for example in FIG. 2, FIG. 3, FIG. 5, and FIG. 6 can be regulated by a solar energy collection regulation system and then connect to direct current (DC) voltage bus 2 for either storage or supplied to alternating current (AC) electrical grid via a suitable DC-to-AC inverter system 11. One example of suitable inverter system is a regulated current source inverter system as disclosed in U.S. Pat. No. 8,212,408 B2 (Fishman) which is incorporated herein by reference in its entirety.

U.S. Pat. No. 8,212,408 B2 (Fishman) discloses a common collection of photovoltaic-generated and wind-generated electric power in a nodal arrangement and transported at high voltage DC to a plurality of regulated current source inverters to supply to the conventional AC electrical transmission system; U.S. Pat. No. 8,212,408 B2 is incorporated herein by reference in its entirety.

In the galvanically isolated DC-DC converters the input DC voltage from DC power sources is converted into high frequency voltage applied to a transformer's primary winding. The AC voltage from the transformer's secondary winding is rectified and applied to common DC voltage bus 2. The galvanically isolated DC-DC converter output voltage can be higher or lower than input voltage depending on the primary to secondary winding turn ratio. The output voltage can also be dynamically regulated by electronic means.

U.S. Pat. No. 9,118,215 B2 (Fishman et al.) and U.S. Pat. No. 9,350,166 B2 (Fishman et al) disclose renewable energy, utility size electric power systems that have high voltage, renewable energy harvesting networks connected via a plurality of galvanically isolated DC-DC converters to a centralized grid synchronized multiphase regulated current source inverter system. U.S. Pat. No. 9,118,215 B2 and U.S. Pat. No. 9,350,166 B2 are incorporated herein by reference in their entireties.

With the large magnitude of electrical energy generated by a utility-scale solar power plant, maximum optimization of the energy collection becomes a significant factor for consideration. The size and cost of DC-DC converters is a major part of this consideration.

In other applications where the galvanic isolation is not required, a simpler circuit of voltage buck/boost regulator may be implemented. One example of a step-up and step-down implementation is disclosed in the U.S. Pat. No. 8,130,518 B2 (Fishman et al.) and U.S. Pat. No. 8,213,199 B2 (Fishman et al) as a part 12a and 12b of regulated current source inverter.

It is one object of the present invention to provide a compact unidirectional or bidirectional efficient galvanically isolated DC-DC converter assembly system for high-capacity alternative energy power systems comprising a 120 kW to 1000 kW rated DC-DC converter assemblies.

It is another object of the present invention to combine compact unidirectional or bidirectional efficient galvanically isolated DC-DC converters into alternative energy power systems with a high-power rating typically in the range of 10 MW to 100 MW.

It is another object of the present invention to provide a compact unidirectional or bidirectional efficient DC-DC converter assembly for high-capacity alternative energy that has a universal design applicable for the range of input voltages from 30V to 3000V and the range of output voltages from 3000V to 30V.

It is another object of the present invention to provide a compact unidirectional or bidirectional efficient DC-DC converter assembly for high-capacity alternative energy where the high voltage range (1000V to 3000V) is achieved by serially connecting plurality of lower voltage rated (650V to 1500V) unidirectional or bidirectional galvanically isolated DC-DC converters.

It is another object of the present invention to provide an aluminum extruded hermetically sealed through an external heatsink case 61 in FIG. 9(b) in an air-cooled enclosure for the compact unidirectional or bidirectional galvanically isolated.

BRIEF SUMMARY OF THE INVENTION

In one aspect the present invention is a BIUT DC-DC converter utilizing two high frequency commutating transistor full bridges (H bridges) to convert DC voltage into high frequency AC voltage and then convert this AC voltage into DC voltage.

In another aspect the present invention is a BIUT DC-DC converter that utilizes silicon-carbide (SiC) semiconductors to facilitate fast, high frequency switching.

In another aspect the present invention is a high power, high frequency BIUT DC-DC converter comprised of a high frequency transformer and inductor placed between two transistor H-bridges to provide galvanic isolation between input and output.

In another aspect the present invention is a high power, high frequency BIUT DC-DC converter comprised of a high frequency transformer, inductor, and capacitor placed between two transistor H-bridges to provide galvanic isolation between input and output.

In another aspect the present invention is a high power, high frequency BIUT DC-DC converter that incorporates electronic controls comprising digital, analog electronic components and microprocessor with firmware to regulate the magnitude and direction of current flow between the BIUT DC-DC converter terminals.

The construction of double full transistor bridges with high frequency transformer and incorporated electronic controls comprising digital, analog electronic components and microprocessor with firmware to regulate the magnitude and direction of current flow between the BIUT DC-DC converter terminals comprises a dual active bridge current converter.

Another aspect of the present invention is a high frequency BIUT DC-DC converter which incorporates a buck/boost regulator circuit comprised of four SiC transistors connected in a full-bridge arrangement and an inductor. The voltage buck/boost regulator is connected in front of dual active bridge current converter. The purpose of the voltage buck/boost regulator circuit is to control the BIUT DC-DC converter input voltage (FIG. 7(a)).

In another aspect the present invention is at least one high frequency BIUT DC-DC converter (100 kHz to 150 kHz) with power SiC components that are collocated with voltage and current control electronic components integrated into one printed circuit board to facilitate converter size and cost minimization.

In another aspect the present invention is at least one high frequency buck/boost regulator is connected with at least two isolated DC-DC dual active bridge (current or voltage) converters (FIG. 7(c) and FIG. 7(d)). The outputs are isolated DC-DC dual active bridge converter are connected in series to achieve voltage higher than the voltage rating of the SiC transistors.

In another aspect the present invention is a universal high frequency BIUT DC-DC converters constructed using identical components for a full range of input and output voltages.

It is another aspect of the present invention to package the BIUT DC-DC converter in an aluminum extruded environmentally sealable air-cooled enclosure shown in FIG. 9(a) and FIG. 9(b).

The above and other aspects of the invention are further set forth in this specification and the appended claims.

BRIEF DESCRIPTION OF THE DRAWINGS

Illustration of the present invention shown in the drawings in a form that is presently preferred; it being understood, however, that this invention is not limited to the precise arrangements and instrumentalities shown.

DETAILED DESCRIPTION OF THE INVENTION

In examples of the present invention a high power DC-DC converter is designated a bidirectional isolated universal topology or "BIUT" high power DC-DC converter configured for connection to a high power DC energy source rated at least 120 KW on a first side terminal of the high power DC-DC converter and a high power DC load rated at least 120 kW on a second side terminal of the high power DC-DC converter. In some examples of the invention a plurality of the BIUT high power DC-DC converters are used for connecting a plurality of DC high power DC energy sources where the sources have different source voltage outputs to a common DC bus operating at a fixed DC bus voltage. In some examples of the invention a plurality of DC loads operating at input DC voltages different from the fixed DC bus voltages are connected to the common DC voltage bus by using the BIUT high power DC-DC converters.

In some examples of the present invention the BIUT high power DC-DC converter assembly of the present invention, a universal design of the BIUT DC-DC converter is used in numerous alternative power DC system applications where a common DC bus connects DC sources and DC loads. Non-limiting DC systems include solar power plants with an integrated battery storage system (BSS); DC microgrids; fast EV charging; hydrogen generation and/or fuel cells or combinations thereof as further disclosed above.

In other examples of the present invention the BIUT high power DC-DC converter assembly has a universal arrangement where identical components are used over a wide range of converter input and output voltages.

In other examples of the present invention the BIUT high power DC-DC converter assembly has a universal arrangement where silicon carbide transistors and diodes are used in the BIUT high power DC-DC converter assembly for high frequency and high power switching in a BIUT high power DC-DC converter assembly.

Figure 1:
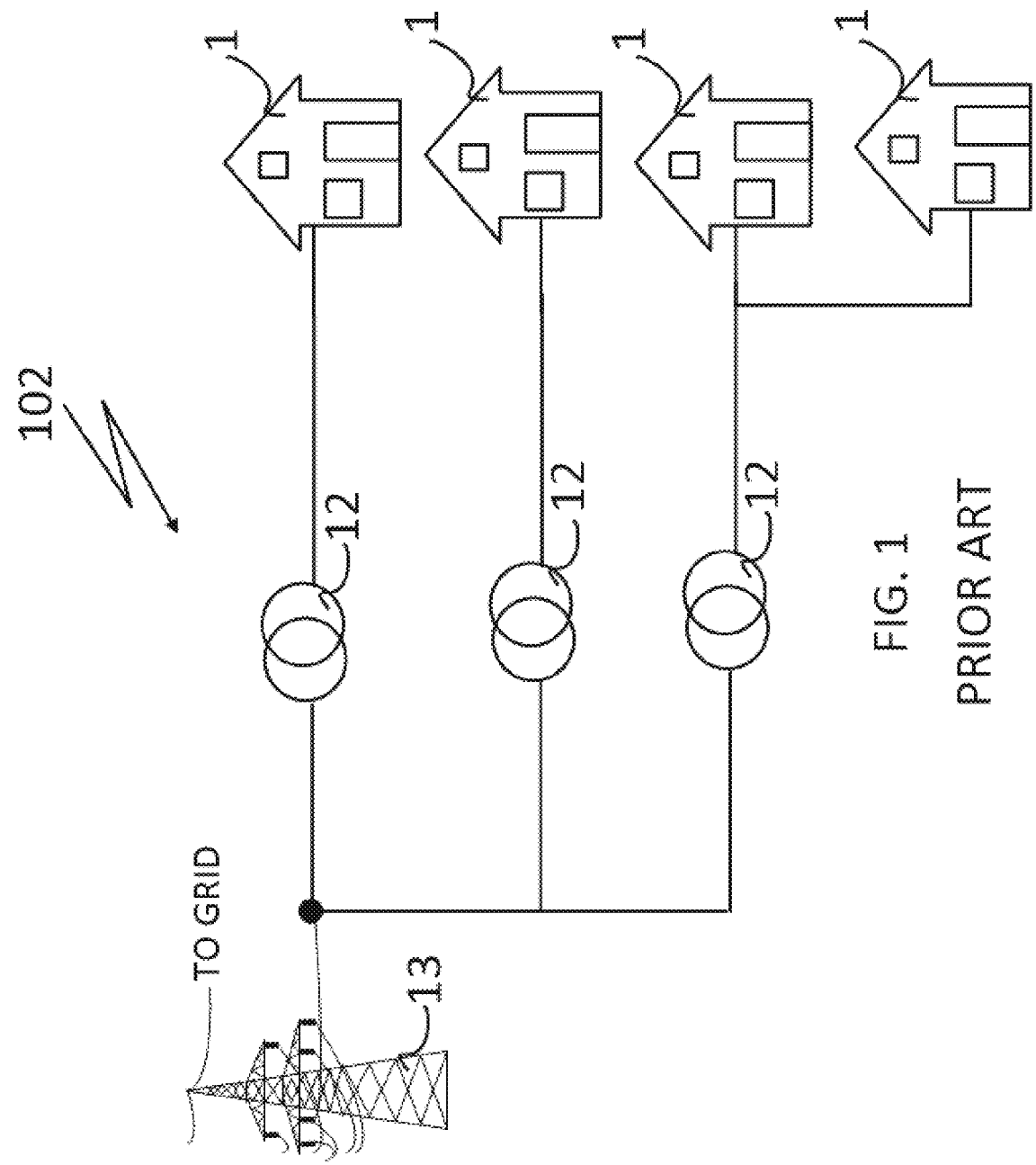
FIG. 1 graphically illustrates one example of a prior art AC power distribution system 102.
Figure 2:
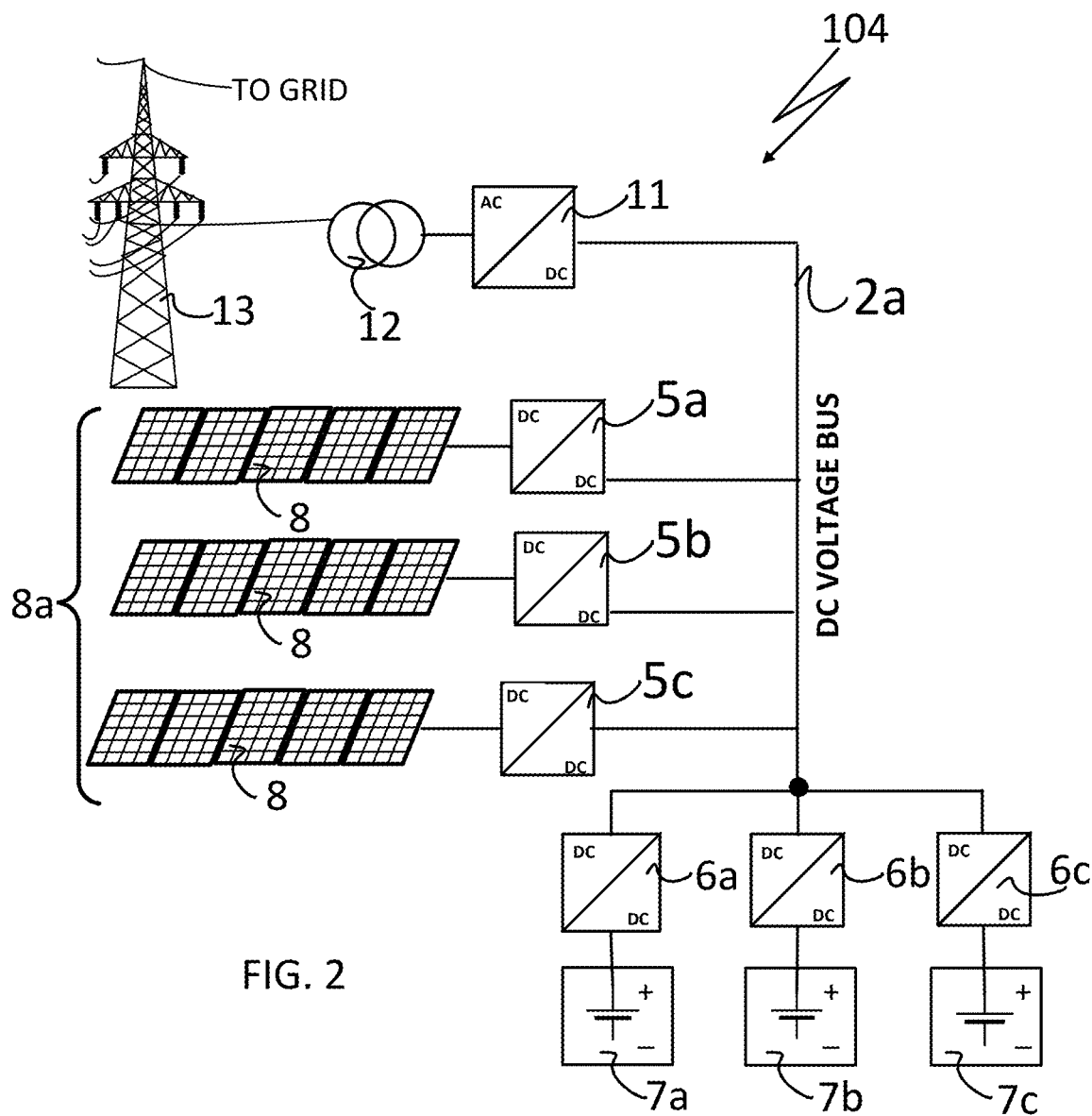
FIG. 2 graphically illustrates one example of a solar farm 104 supplying solar energy to an AC grid via a DC power bus with integrated battery storage system.
Figure 3:
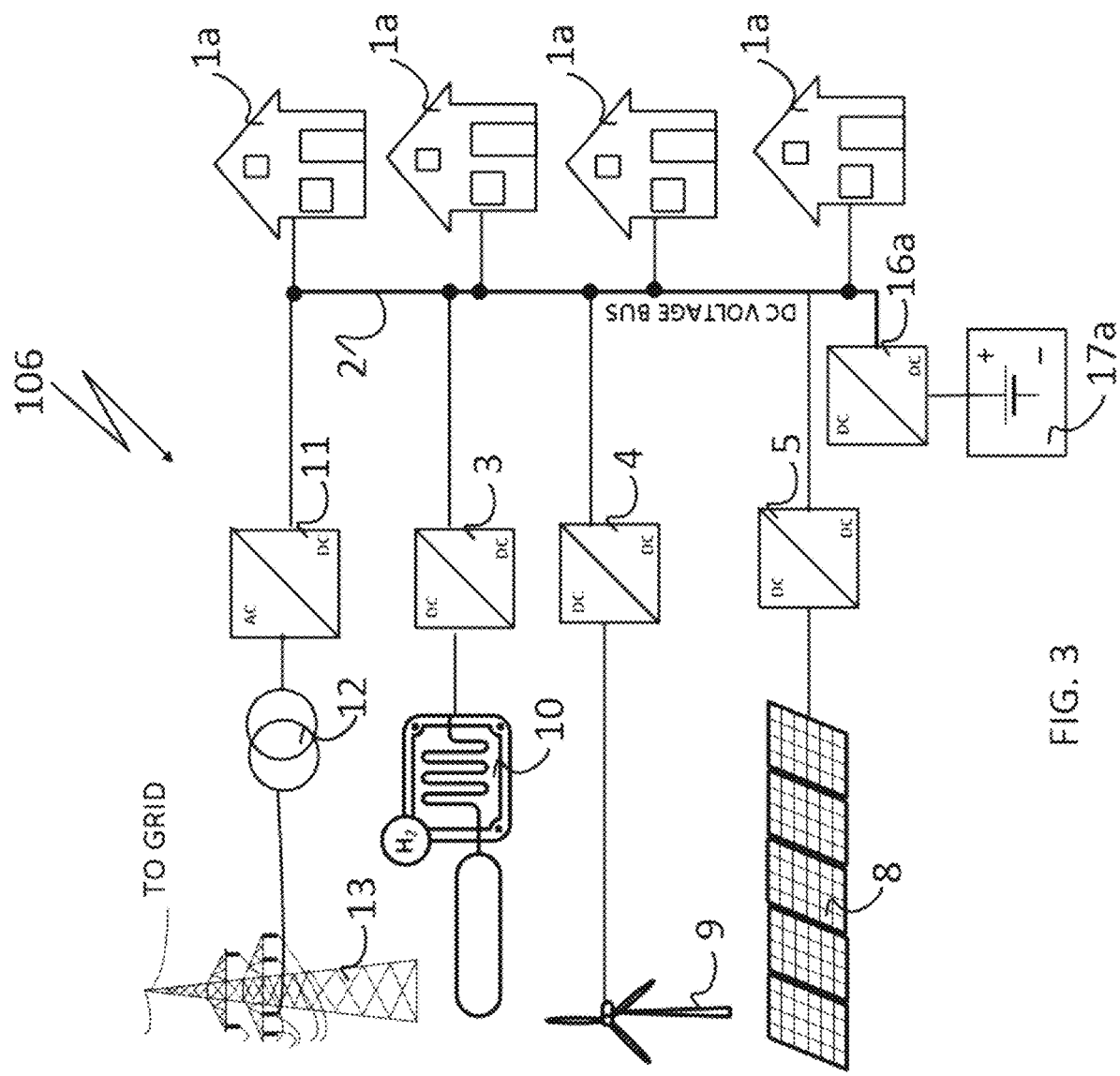
FIG. 3 graphically illustrates one example of a DC microgrid power system 106.
Figure 4:
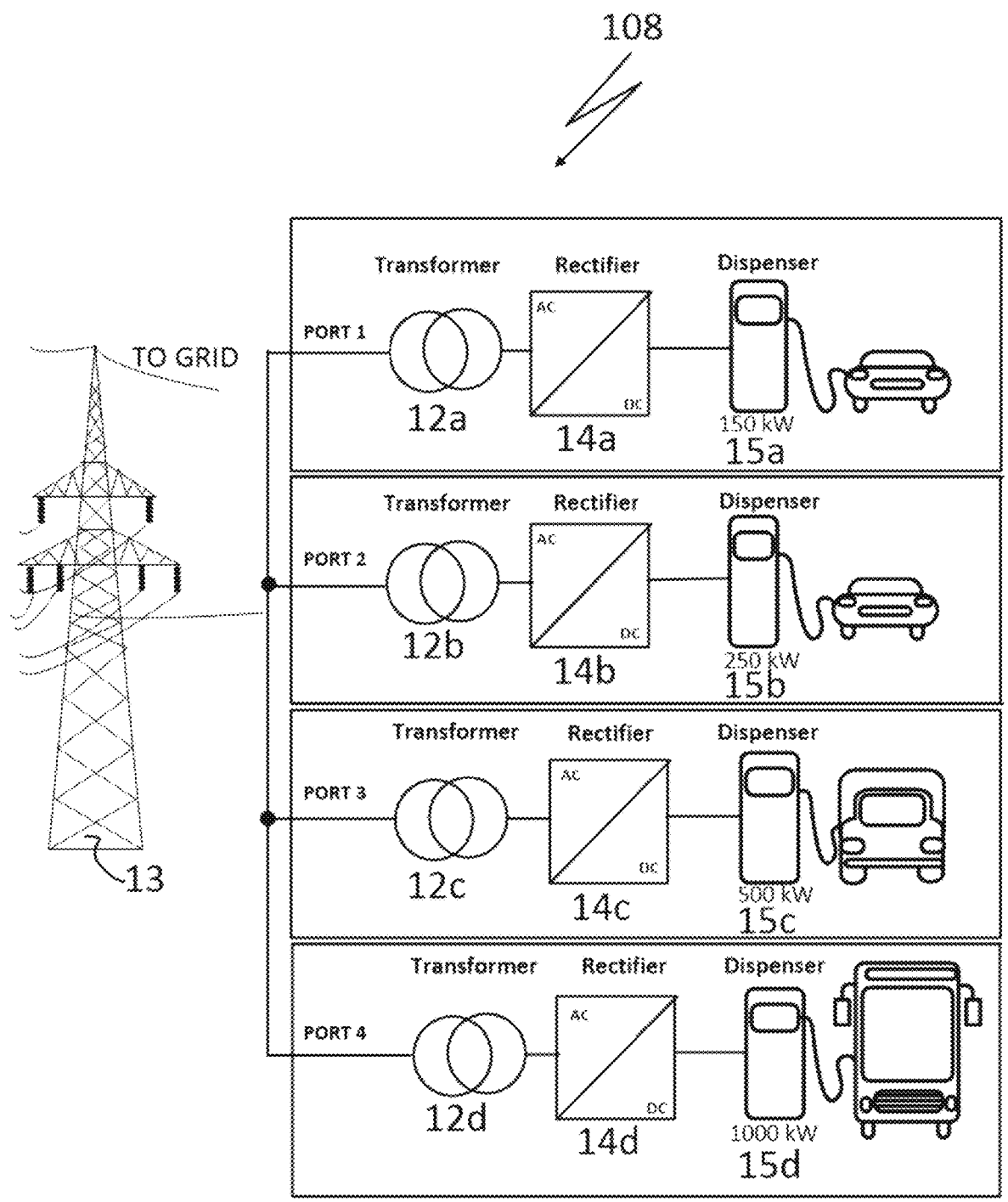
FIG. 4 graphically illustrates one example of a multiport fast-charging station 108 for electric vehicles supplied power from an AC power grid.
Figure 5:
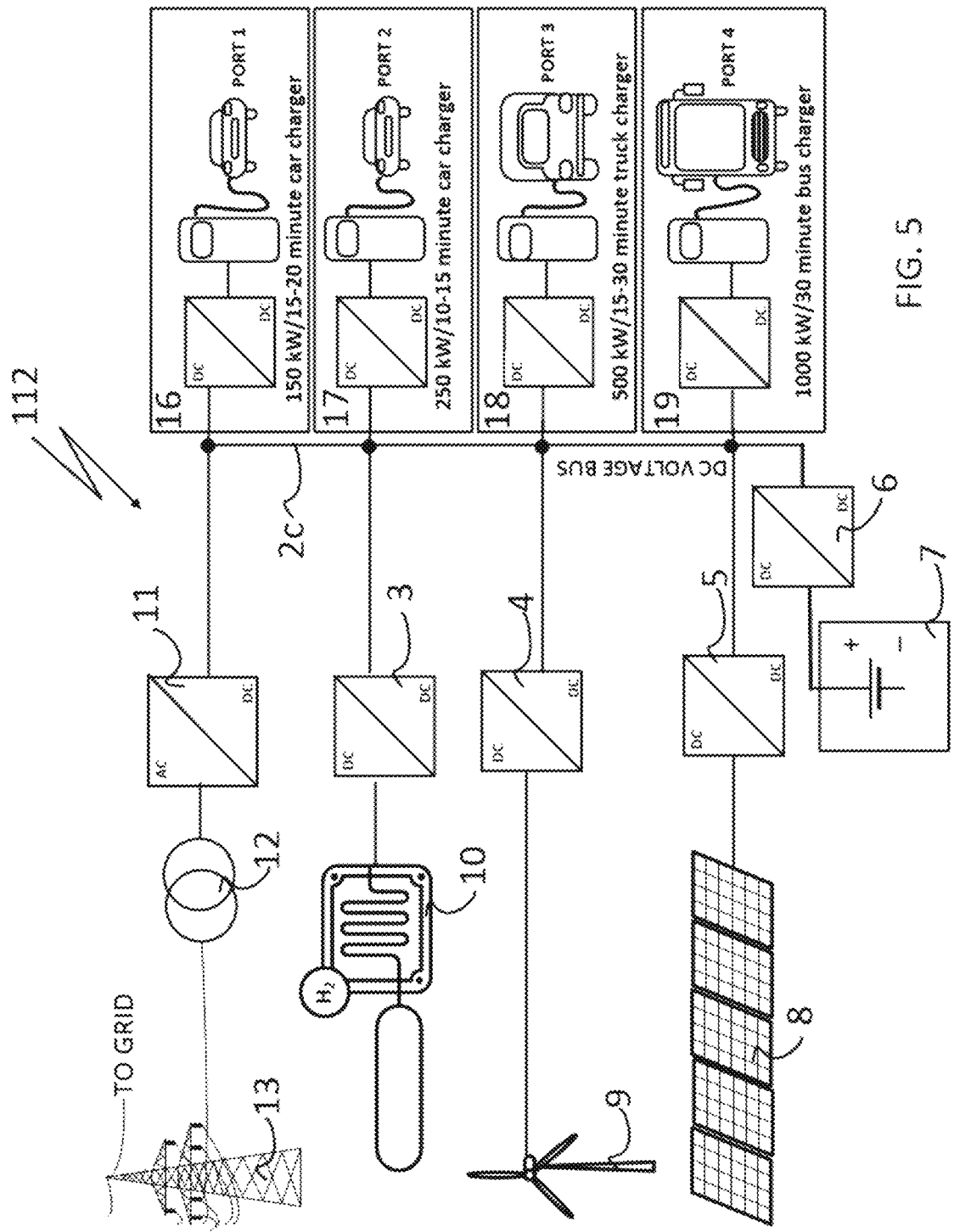
FIG. 5 graphically illustrates one example of a state-of-the-art AC superfast electric vehicle charging system 112 based on a DC microgrid.
Figure 6:
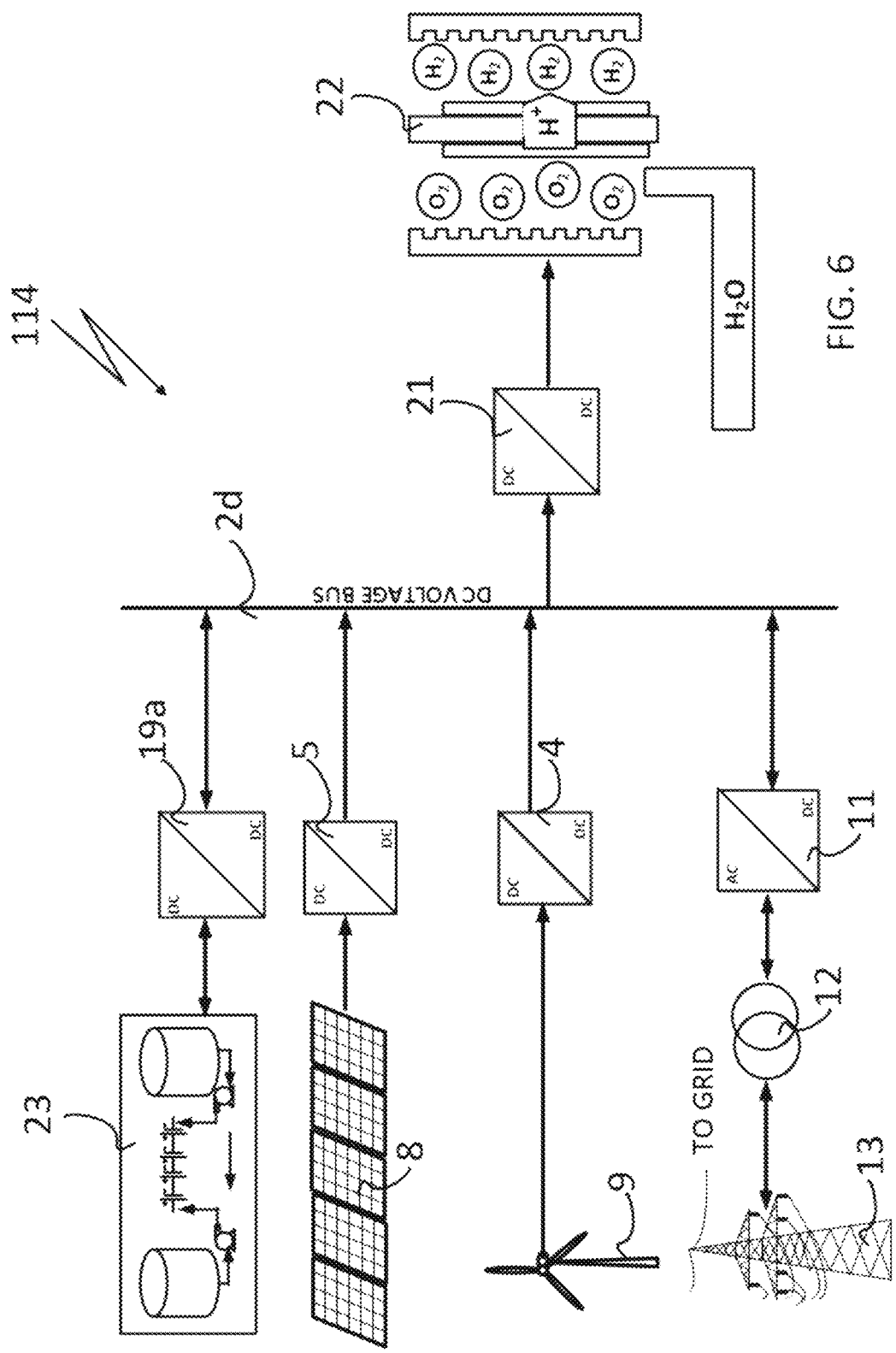
FIG. 6 graphically illustrates at one DC microgrid for a proton exchange membrane (PEM) hydrogen generating plant 114.
Figure 7A:
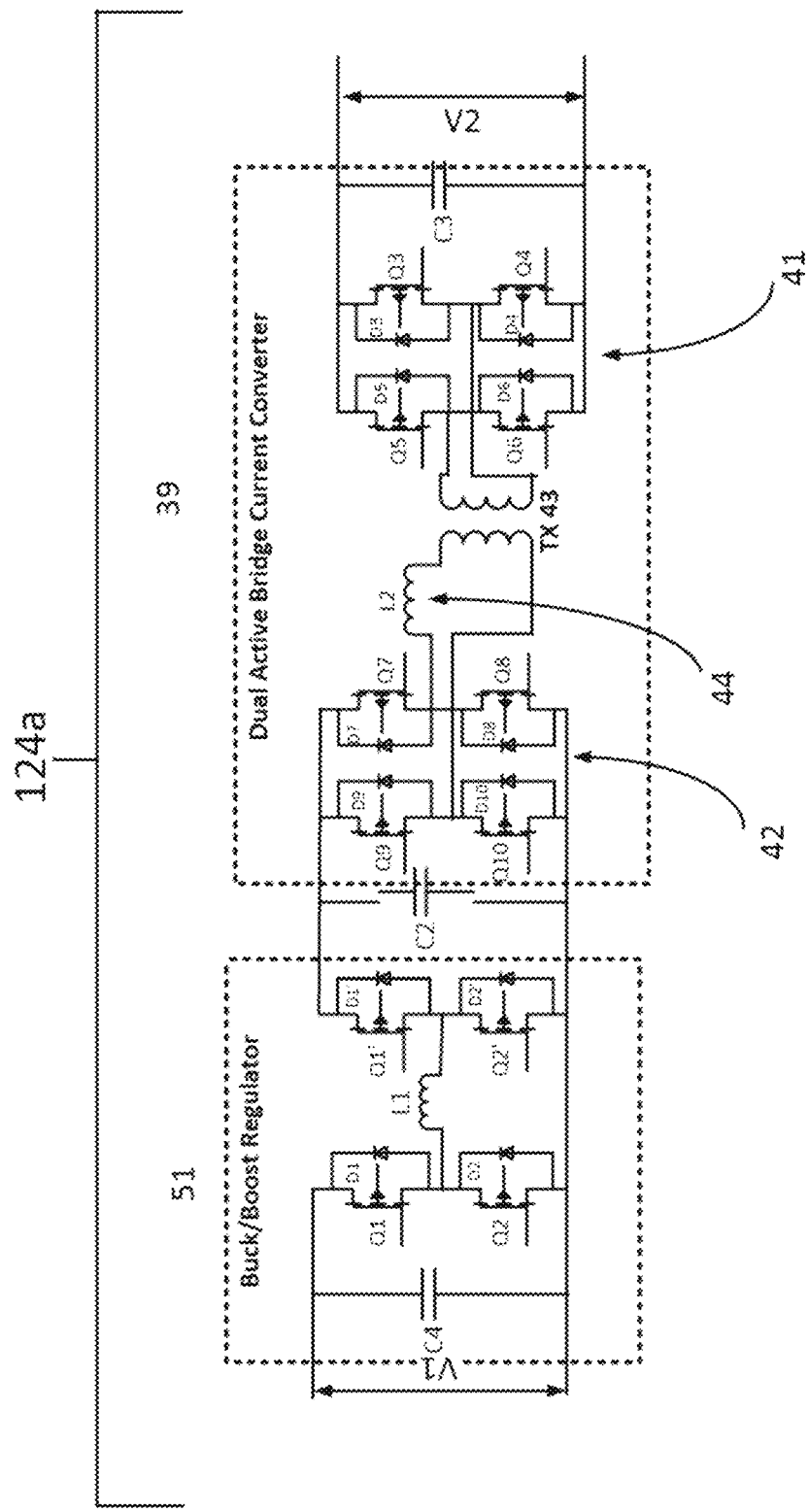
FIG. 7(a) is an electrical schematic diagram for a high power BIUT DC-DC converter with a single buck/boost regulator and a single isolated bidirectional dual active bridge current converter.

FIG. 7(a) is an electrical schematic diagram of one example of a BIUT high power DC-DC converter 124a of the present invention. The converter diagram is separated into two sections bounded by dashed rectangles, namely a buck/boost regulator 51 and a dual active bridge current converter section 39.

Figure 7B:
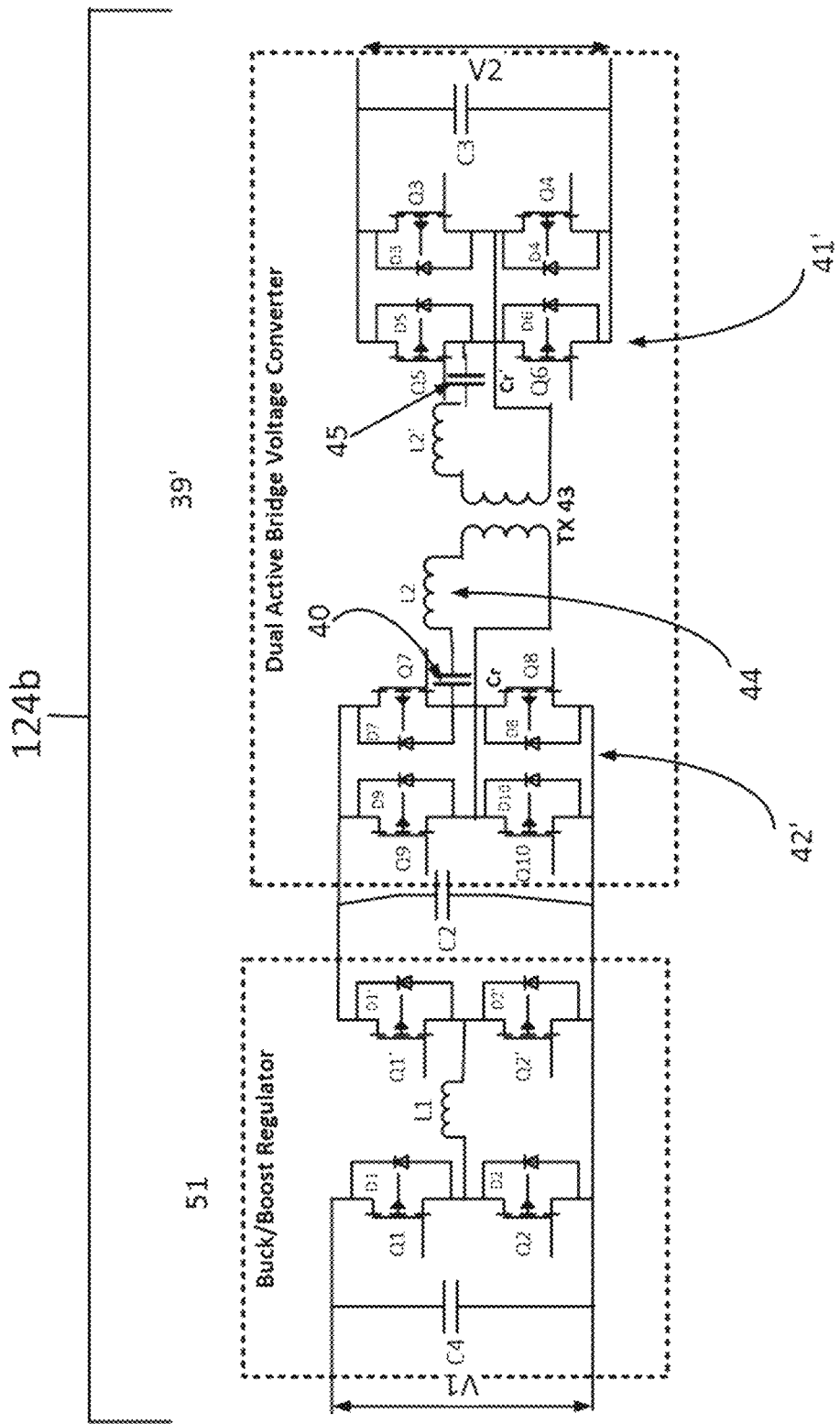
FIG. 7(b) is an electrical schematic diagram for a high power BIUT DC-DC converter with a single buck/boost regulator and a single isolated bidirectional dual active bridge voltage converter.

FIG. 7(b) is an electrical schematic of another example of a BIUT high power DC-DC converter 124b of the present invention. The converter diagram is separated into two sections bounded by dashed rectangles, namely a buck/boost regulator 51 and a dual active bridge voltage converter section 39'.

Figure 8A:
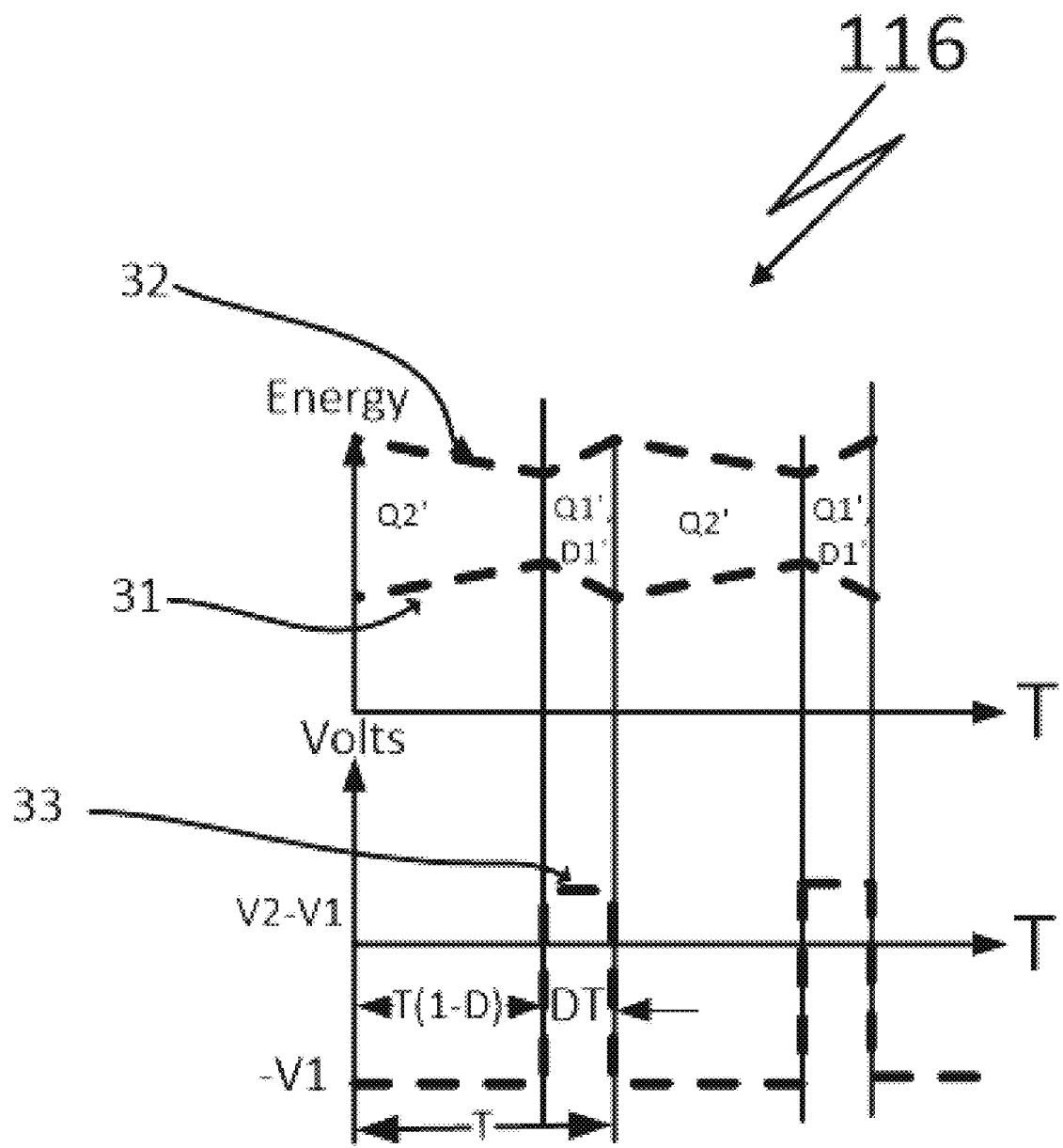
FIG. 8(a) graphically illustrates parameters for a buck/roost regulator over time for the step up voltage operation shown in FIG. 7(a).

In FIG. 7(a) and FIG. 7(b), in the step-up operation of buck/boost regulator section 51, input voltage (V1) is less than the buck/boost regulator section output voltage on capacitor C2. Referring to FIG. 7(a) and for step-up operation, switch Q1 is permanently open. Initially the input voltage (V1) charges the output capacitor C2 to input voltage (V1) via diode D1'. Then the step-up process begins: as shown in FIG. 8(a) time period T is divided into time segments (1-D)·T and D·T where D is a duty cycle that can range in value from 1% to 99%. To step up the voltage on capacitor C2 switch Q2' is periodically closed within every time period T for time segment (1-D)·T. During the time segment (1-D)·T, input voltage (V1) is applied to inductor L1 and current through inductor L1 is increasing and storing energy as illustrated by line 31 in FIG. 8(a). When switch Q2' is opened, the extra energy accumulated in inductor L1 discharges into output capacitor C2 over the time segment D·T as illustrated by line 31 in FIG. 8(a). The voltage across capacitor C2 is illustrated by line 32 in FIG. 8(a). The voltage across inductor L1 is illustrated by line 33 in FIG. 8(a).

In FIG. 7(a), in step-up operation the voltage across capacitor C2 is increased according to the equation:

$$V_{C2} = V1/(1-D) \quad \text{(Equation 1)}.$$

Figure 8B:
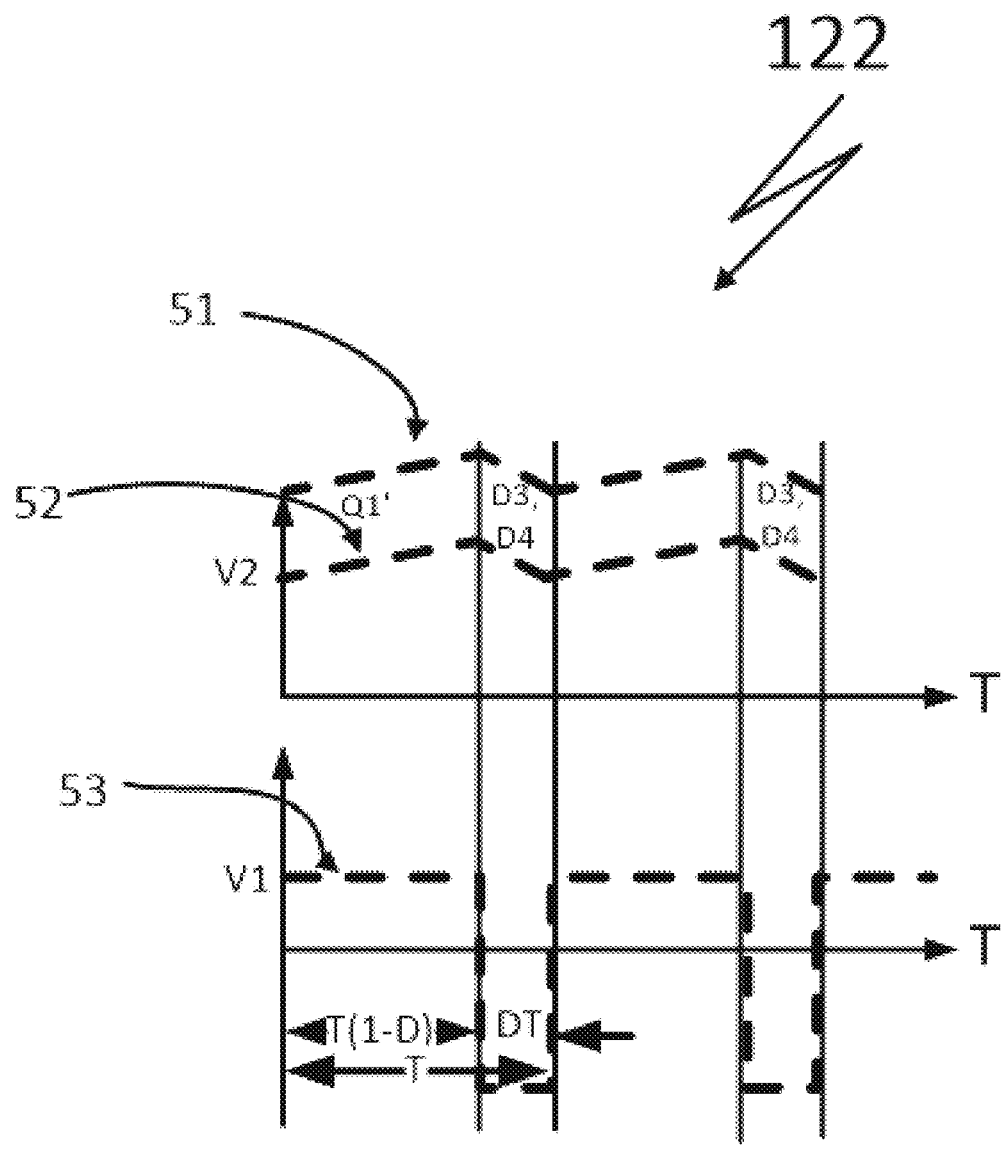
FIG. 8(b) graphically illustrates parameters for a buck/boost regulator converter over time for the step down voltage operation shown in FIG. 7(a).

For step-down operation of buck/boost regulator 51 voltage on capacitor C2 is lower than (V1). As shown in FIG. 8(b) time period T is divided into time segments (1-D)·T and D·T where D is a duty cycle that can range in value from 1% (0) to 99% (1.0). Transistor Q1', is open, while transistor Q1 is switched ON/OFF with a period T to control the voltage V1. During time (1-D)·T time Q1' is periodically closed within every time period T for time segment (1-D). During the time segment (1-D), the voltage on capacitor C4 is applied through closed transistor Q1' to inductor L1.

In step-down operation the input voltage (V1) is decreased according to the equation:

$$V1 = V_{C2} \cdot (1-D) \quad \text{(Equation 2)}.$$

The dual active bridge current converter 39 in FIG. 7(a) includes transistor bridge 42 formed from four transistors Q7 through Q10 and transistor bridge 41 formed from four transistors Q3 through Q6. The two H bridges are separated by a transformer TX 43 with inductor L2 44. The inductance of inductor L2 may be incorporated into transformer TX 43.

In FIG. 7(a), both H bridges (41 and 42) operate synchronously at fixed frequencies ranging between 50 kHz to 150 kHz. H bridge 42 converts the DC voltage on capacitor C2 (1500 VDC) into symmetrical AC square wave voltage up to +/−1500 V applied to the transformer TX 43 primary windings.

The AC square wave voltage on the transformer TX 43 secondary windings is then applied to H bridge 42. H bridge 41 rectifies the AC square wave voltage back to DC voltage applied to capacitor C3. Transformer TX 43 provides galvanic isolation between primary DC voltage on C2 and secondary DC voltage on capacitor C3.

The direction and magnitude of the current through the dual active bridge current converter 39 is defined by the time difference of control pulses on the transistor H bridge 42 vs control pulses on the transistor H bridge 41. Then the control pulses on the transistor H bridge 42 are leading the series of control pulses on the transistor H bridge 41 the current flows from input to output. Conversely, when the control pulses on the transistor H bridge 42 are lagging the series of control pulses on the transistor H bridge 41, the current flows from output to input. The duration of the time difference defines the magnitude of current.

The dual active bridge voltage converter 39' in FIG. 7(b) includes transistor bridge 42' and transistor bridge 41'. The two H bridges are separated by a transformer TX 43 with inductor L2 and capacitor Cr (40) on primary side and L2' and capacitor Cr' (45) on secondary side. The inductance of inductor L2 and L2' may be incorporated into transformer TX 43. The inductor and capacitor form a series resonant circuit.

Both H bridges operate synchronously at variable frequencies ranging between 50 kHz to 150 kHz. The variation of the frequency changes the impedance of series resonant circuit L2-Cr (L2'-Cr') resulting in change of the voltage gain of the dual active bridge voltage converter 39'. The direction of the current is defined by activating either H bridge 41' or H bridge 42'. The operation of the dual active bridge voltage converter 39' is further explained in the patent U.S. Pat. No. 8,130,518 B2.

Figure 7C:
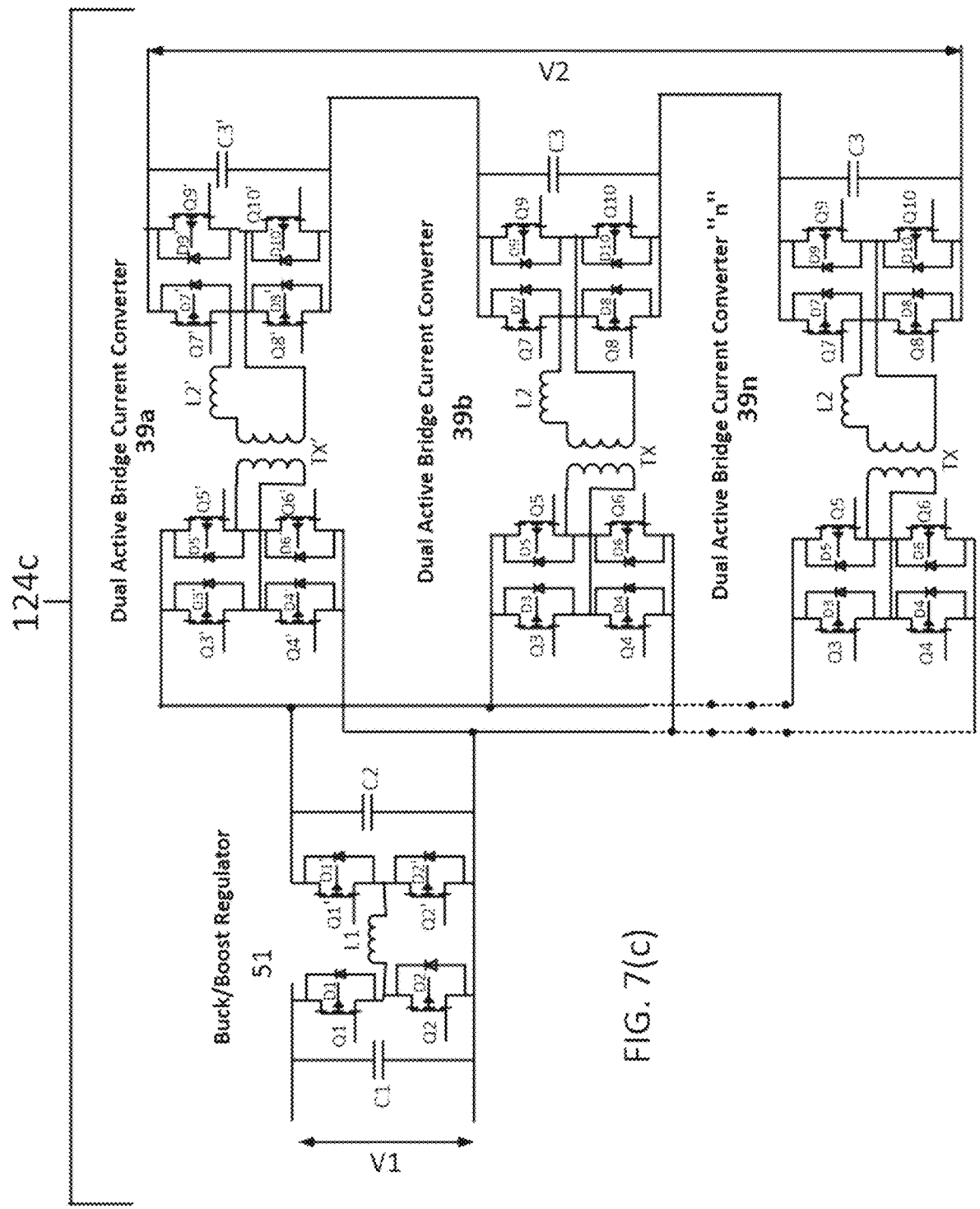
FIG. 7(c) is an electrical schematic diagram for a high power BIUT DC-DC converter with a single buck/boost regulator and at least two isolated bidirectional dual active bridge current converters.

FIG. 7(c) is an electrical schematic diagram of another example of a BIUT high power DC-DC converter 124c of the present invention. The converter diagram 124c is separated into three sections: at least two dual active bridge current converter sections 39a and 39b with converter 39n designating a total number of "n" (where variable "n" is equal to the total number of dual active bridge current converter sections in this example). There is one bidirectional buck/boost regulator section 51.

Figure 7D:
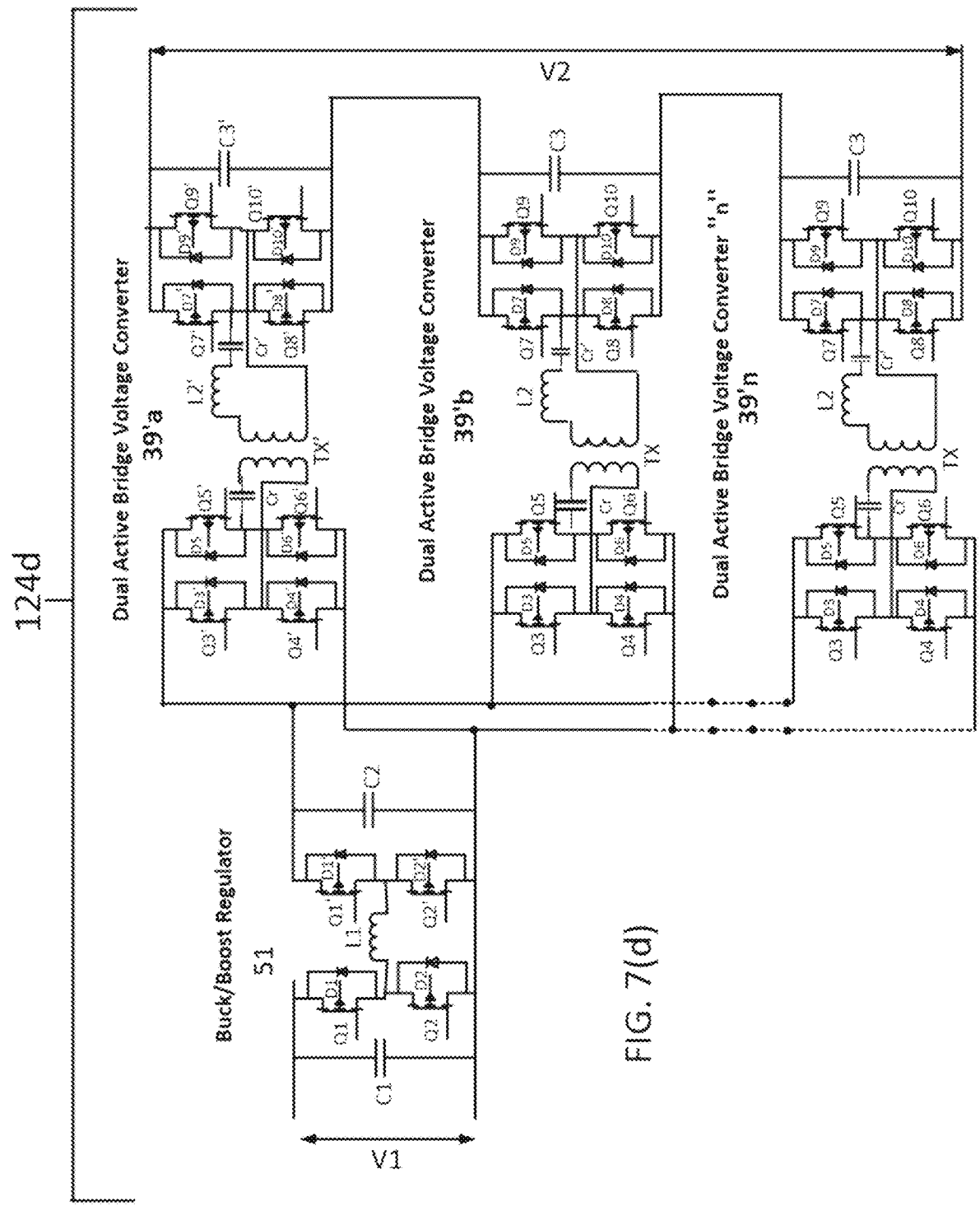
FIG. 7(d) is an electrical schematic diagram for a high power BIUT DC-DC converter with a single buck/boost regulator and at least two isolated bidirectional dual active bridge voltage converters.

FIG. 7(d) is an electrical schematic diagram of another example of a BIUT high power DC-DC converter 124d of the present invention. The converter diagram 124d is separated into three sections: at least two dual active bridge voltage converter sections 39'a and 39'b with converter 39'n designating a total number of "n" (where variable "n" is equal to the total number of dual active bridge voltage converter sections in this example). There is one bidirectional buck/boost regulator section 51.

In one example of the present invention a BIUT high power DC-DC converter is contained in an extruded aluminum environmentally sealable air-cooled enclosure. One example of the closed extruded aluminum, environmentally sealable, air-cooled enclosure 60 is shown on FIG. 9(a) with four top corner fans 62 with the extruded aluminum enclosure having overall dimensions of 18 inches long; 7.5 inches wide and 21 inches high for a BIUT high power DC-DC converter rated at 120 kW.

Figure 9A:
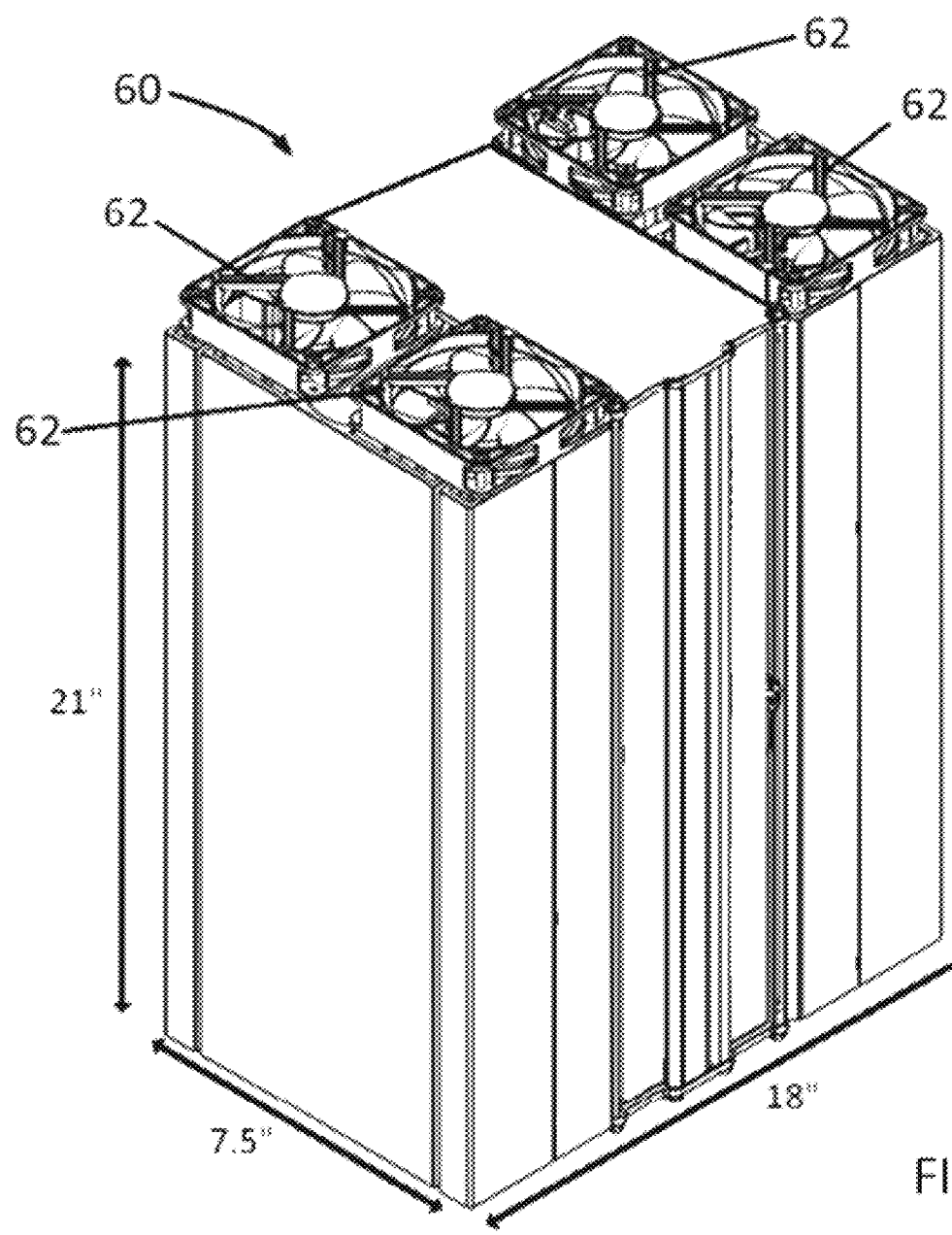
FIG. 9(a) illustrates one example of the package of the BIUT DC-DC converter in an aluminum extruded environmentally sealable air-cooled NEMA 4 enclosure. The NEMA 4 enclosure is cooled by forced air impelled by environmentally sealed fans 62.
Figure 9B:
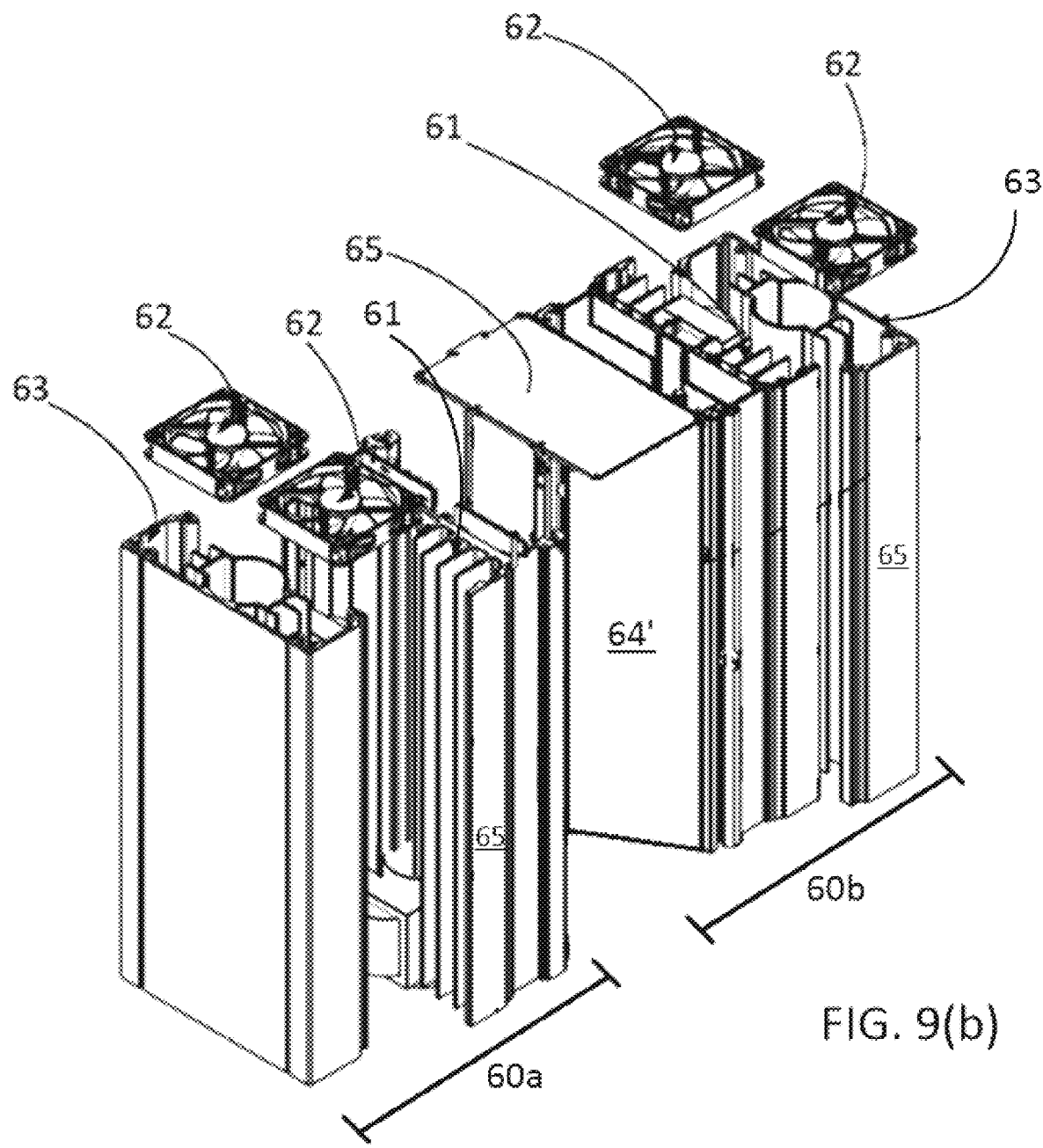
FIG. 9(b) is an exploded view of the DC-DC converter 60 in FIG. 9(a).

FIG. 9(b) is an exploded view of the enclosure in FIG. 9(a) that reveals major components of the BIUT DC-DC converter. Each half part of the enclosure, first half part 60a and second half part 60b is formed from heatsink case 61 containing two electronic control boards 64' (one shown in FIG. 9 (b) in outline and heat exchanger compartment 63 for magnetic components. The heat exchangers in the heat exchanger compartments are cooled by a forced air stream created by operation of fans 62. The interior ends of the aluminum extrusions are hermetically sealed by two end caps 65.

Figures 10A, 10B, 10C:
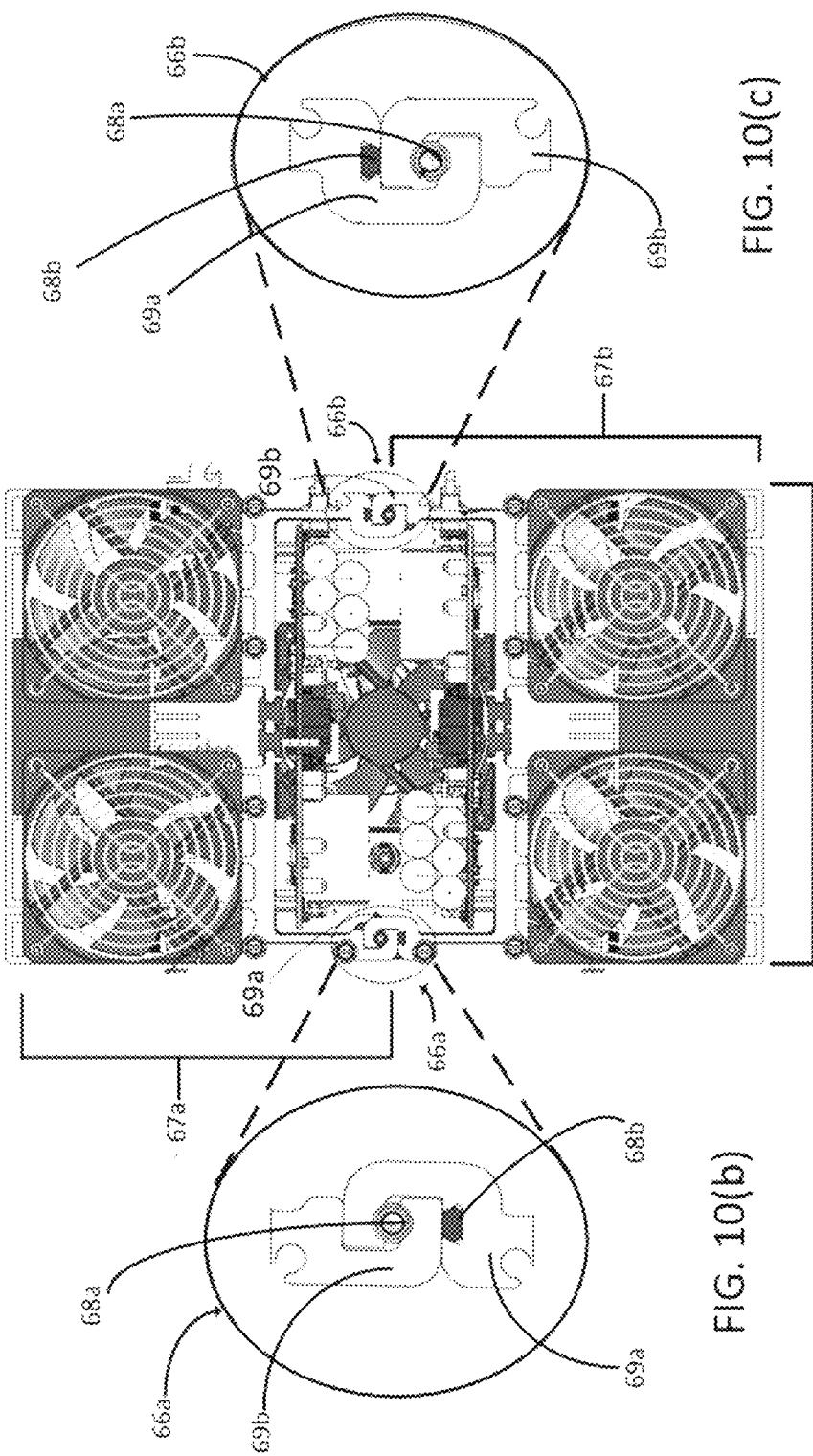
FIG. 10(a) is a top plan view of the DC-DC converter 6 in FIG. 9(a) with endcap 65 removed to illustrate interlocking mechanism for two halves 67a and 67b of the DC-DC converter 60 in FIG. 9(a).
FIG. 10(b) and FIG. 10(c) are enlarged views of one example of an interlocking mechanisms 66a and 66b for the DC-DC converter 60 in FIG. 9(a).

FIG. 10(*a*) is a top plan view of the DC-DC converter 60 in FIG. 9(*a*) with endcap 65 removed to illustrate interlocking mechanisms 66*a* and 66*b* for two halves 67*a* and 67*b* of the enclosed BIUT DC-DC converter 60 in FIG. 9(*a*).

FIG. 10(*b*) and FIG. 10(*c*) are enlarged views of one example of an interlocking mechanisms 66*a* and 66*b* for the DC-DC converter 60 in FIG. 10(*a*). The two halves 67*a* and 67*b* of the BIUT DC-DC converter are joined together by couplings 66*a* and 66*b* shown in enlarged detail of FIG. 10(*b*) and FIG. 10(*c*). The couplings 66*a* and 66*b* are horizontally mirror image to each other. Each of the two couplings comprises clasps 69*a* and 69*b*. Spring pin (or set screw) 68*a* separate the two clasps 69*a* and 69*b* and compresses elastic cord 68*b* forming a non-penetrable seal between the two halves of the enclosure for the BIUT DC-DC converter 60 shown in FIG. 9(*a*).

The converter can also be provided as a liquid-cooled, hermetically sealed enclosure for the compact unidirectional or bidirectional galvanically isolated cost-efficient DC-DC converter.

In the description above, for the purposes of explanation, numerous specific requirements and several specific details have been set forth in order to provide a thorough understanding of the example and embodiments. It will be apparent however, to one skilled in the art, that one or more other examples or embodiments may be practiced without some of these specific details. The particular embodiments described are not provided to limit the invention but to illustrate it.

Reference throughout this specification to "one example or embodiment," "an example or embodiment," "one or more examples or embodiments," or "different example or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention.

The invention claimed is:

1. A high power DC-DC converter comprising a bidirectional isolated universal topology (BIUT) high power DC-DC converter, the high power DC-DC converter configured for connection to a high power DC energy source rated at least 120 kW on a first side terminal of the high power DC-DC converter, at least one of the high power DC energy source and a high power DC load rated at least 120 kW on a second side terminal of the high power DC-DC converter, wherein the high power DC-DC converter reverses a load-to-source current flow from the high power DC load connected to the second side terminal to an active high power DC energy source on the first side terminal, the high power DC-DC converter further comprising one buck/boost regulator connected to the first side terminal of the high power DC-DC converter and at least two dual active bridge bidirectional current converters connected to the second side terminal of the high power DC-DC converter, a first H bridge section of each of the at least two dual active bridge bidirectional current converters connected together in parallel and one buck/boost regulator H bridge connected to the first H bridge section of each of the at least two dual active bridge bidirectional current converters in series.

2. The high power DC-DC converter of claim 1 wherein the high power DC-DC converter balances a converter difference voltage between the high-power DC energy source connected to the first side terminal and the high power DC load connected to the second side terminal.

3. The high power DC-DC converter of claim 1 wherein the high power DC-DC converter controls a current flow from the high-power DC energy source connected to the first side terminal to the high power DC load connected to the second side terminal.

4. A high power DC-DC converter comprising a bidirectional isolated universal topology (BIUT) high power DC-DC converter, the high power DC-DC converter configured for connection to a high power DC energy source rated at least 120 KW on a first side terminal of the high power DC-DC converter, at least one of the high power DC energy source and a high power DC load rated at least 120 kW on a second side terminal of the high power DC-DC converter, wherein the high power DC-DC converter reverses a load-to-source current flow from the high power DC load connected to the second side terminal to an active high power DC energy source on the first side terminal, the high power DC-DC converter further comprising one buck/boost regulator connected to the first side terminal (V1) of the high power DC-DC converter and one dual active bridge bidirectional voltage converter connected to the second side terminal of the high power DC-DC converter, the one dual active bridge bidirectional voltage converter including a transformer, a first inductor coupled to a first side of the transformer, and a second inductor coupled to a second side of the transformer.

5. The high power DC-DC converter of claim 1 wherein the high power DC-DC converter reverses a load-to-source current flow from the high power DC load connected to the second side terminal to an active high power DC energy source on the first side terminal, the high power DC-DC converter further comprising one buck/boost regulator connected to the first side terminal of the high power DC-DC converter and one dual active bridge bidirectional voltage converter connected to the second side terminal of the high power DC-DC converter.

6. A high power DC-DC converter comprising a bidirectional isolated universal topology (BIUT) high power DC-DC converter, the high power DC-DC converter configured for connection to a high power DC energy source rated at least 120 kW on a first side terminal of the high power DC-DC converter, at least one of the high power DC energy source and a high power DC load rated at least 120 kW on a second side terminal of the high power DC-DC converter, wherein the high power DC-DC converter reverses a load-to-source current flow from the high power DC load connected to the second side terminal to an active high power DC energy source on the first side terminal, the high power DC-DC converter further comprising one buck/boost regulator connected to the first side terminal of the high power DC-DC converter and at least two dual active bridge bidirectional voltage converters connected to the second side terminal (V2) of the high power DC-DC converter, a first H bridge section of each of the at least two dual active bridge bidirectional voltage converters connected together in parallel and the one buck/boost regulator connected to the first H bridge section of each of the at least two dual active bridge bidirectional voltage converters in series.

7. The high power DC-DC converter of claim 4 wherein the buck/boost regulator and the one dual active bridge bidirectional voltage converter comprise H bridges each further including Silicon Carbide power transistors.

8. The high power DC-DC converter of claim 5 wherein the buck/boost regulator and the one dual active bridge bidirectional voltage converter comprise H bridges each further including Silicon Carbide power transistors.

9. The high power DC-DC converter of claim 1 wherein the at least two dual active bridge bidirectional current converters are connected in parallel to the buck/boost regulator on one of the first terminal side or the second terminal side and connected serially to each other on an opposing terminal side.

10. The high power DC-DC converter of claim 6 wherein the at least two dual active bridge bidirectional voltage converters are connected in parallel to the buck/boost regulator on one of the first terminal side or the second terminal side and connected serially to each other on an opposing terminal side.

11. The high power DC-DC converter of claim 1 further comprising an extruded aluminum air-cooled enclosure for containment of the high power DC-DC converter.

12. The high power DC-DC converter of claim 11 wherein the extruded aluminum air-cooled enclosure comprises a first and a second extruded aluminum enclosure subassemblies.

13. The high power DC-DC converter of claim 12 further comprising a pair of couplings for joining the first extruded aluminum enclosure subassembly and the second extruded aluminum enclosure subassembly together.

14. A method of supplying DC power in a high power DC system with a plurality of the DC-DC converters of claim 1, the method comprising:
   connecting one or more high power DC energy sources operating at a common DC bus voltage directly to a common DC bus;
   connecting one or more high power DC alternative or renewable energy sources operating at the common DC bus voltage directly to the common DC bus;
   connecting each one of the high power DC alternative energy sources or renewable energy sources operating at a non-common DC bus voltage to the common DC bus by one of the plurality of the high power DC-DC converters, wherein the one of the plurality of the high power DC-DC converters includes one buck/boost regulator connected to a first side terminal of the one of the plurality of high power DC-DC converters and at least two dual active bridge bidirectional current converters connected to a second side terminal of the one of the plurality of high power DC-DC converters, a first H bridge section of each of the at least two dual active bridge bidirectional current converters connected together in parallel and one buck/boost regulator H bridge connected to a first H bridge section of each of the at least two dual active bridge bidirectional current converters in series;
   connecting one or more high power DC loads operating at the common DC bus voltage directly to the common DC bus;
   connecting each one of the high power DC loads operating at a non-common DC bus voltage to the common DC bus by one of the plurality of high power DC-DC converters; and
   equalizing an output voltage of the plurality of high power DC-DC converters to the common DC bus voltage.

15. The method of claim 14 wherein a plurality of high power DC energy sources and loads are selected from the group: solar energy systems in combination with battery storage systems; DC microgrids; fast electric vehicle charging; hydrogen generation; and fuel cell systems.

* * * * *